Jan. 25, 1966  J. P. ALMASY  3,231,306
INFANT'S SEAT FOR AN AUTOMOBILE
Filed March 19, 1964  2 Sheets-Sheet 1
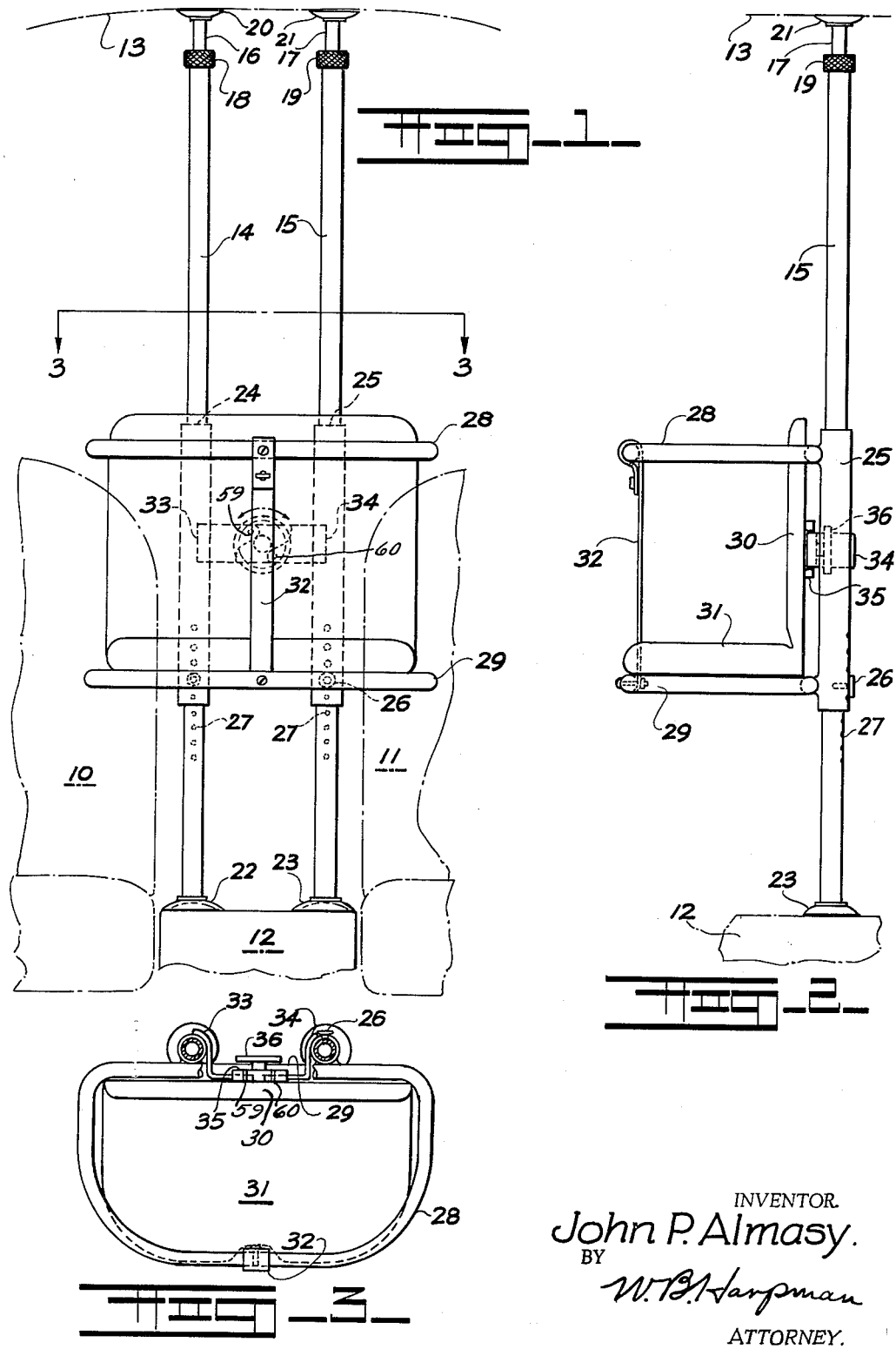
INVENTOR.
John P. Almasy.
BY
W. B. Harpman
ATTORNEY.

Jan. 25, 1966   J. P. ALMASY   3,231,306
INFANT'S SEAT FOR AN AUTOMOBILE
Filed March 19, 1964   2 Sheets-Sheet 2
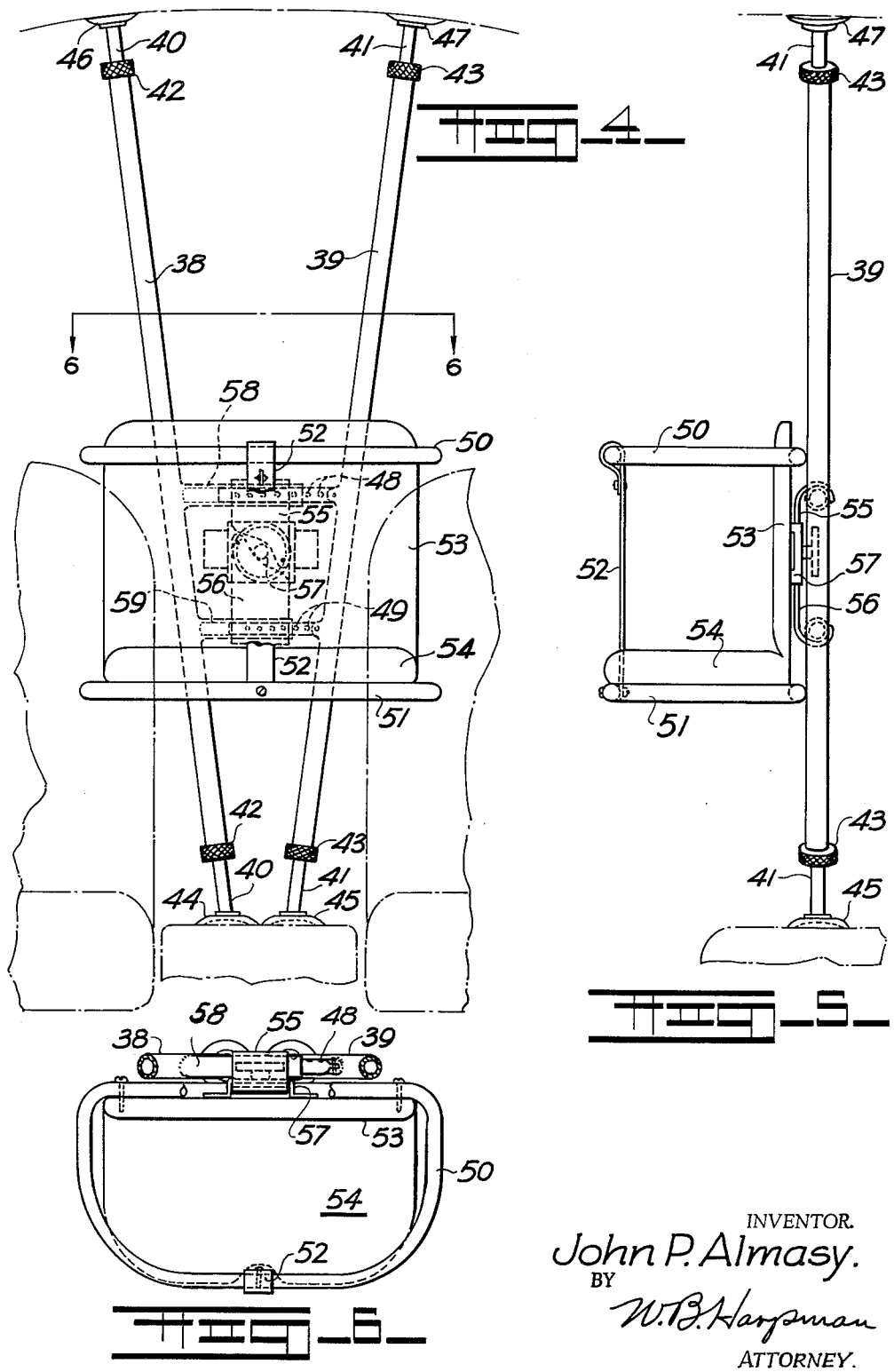
INVENTOR.
John P. Almasy.
BY
W. B. Harpman
ATTORNEY.

3,231,306
INFANT'S SEAT FOR AN AUTOMOBILE
John P. Almasy, 32 State St., Struthers, Ohio
Filed Mar. 19, 1964, Ser. No. 353,147
1 Claim. (Cl. 297—345)

This invention relates to an attachment for an automobile and particularly an attachment arranged to hold an infant's seat in desired position in the automobile, and more particularly in an automobile where there are separate or so-called bucket seats spaced with respect to one another and having an intervening cabinet, usually termed a console, positioned therebetween.

The principal object of the invention is the provision of an attachment for positioning an infant's seat in an automobile.

A further object of the invention is the provision of a simple and efficient device which may be quickly and easily installed in an automobile so that an infant can be positioned therein and held securely thereby.

A still further object of the invention is the provision of a telescopically arranged tubular support device that may be positioned between a lower portion of an automobile, for example the console, between the bucket seats thereof, and the roof thereof so as to be self-positioning by tension therebetween.

A still further object of the invention is the provision of an attachment for an automobile arranged to be positioned vertically between the spaced front seats thereof so that an infant's chair, a tray, or an object supporting platform may be carried thereby.

The device for positioning an infant's seat in an automobile as disclosed herein comprises a solution to a problem that came into being with the advent and popularity of the spaced front seats, usually termed bucket seats, and the later provision of a cabinet, or so-called console, between the same, which construction makes it impossible to attach the usual infant's seat with its hooks arranged to engage the back of the automobile seat.

The popularity of automobile bodies and seat arrangements incorporating bucket seats is such that many owners thereof find it impossible to position an infant's seat or chair in the usual manner and the present invention provides a simple and efficient solution to this problem.

With the foregoing and other objects in view which will appear as the description proceeds, the invention resides in the combination and arrangement of parts and in the details of construction hereinafter described and claimed, it being the intention to cover all changes and modifications of the example of the invention herein chosen for purposes of the disclosure, which do not constitute departures from the spirit and scope of the invention.

The invention is illustrated in the accompanying drawing, wherein:

FIGURE 1 is a front elevational view showing the device in position in an automobile.

FIGURE 2 is a side elevational view thereof.

FIGURE 3 is a horizontal section on line 3—3 of FIGURE 1.

FIGURE 4 is a front elevational view of a modified form of the infant's seat for automobiles.

FIGURE 5 is a side elevational view thereof.

FIGURE 6 is a horizontal section on lines 6—6 of FIGURE 4.

By referring to the drawings and FIGURES 1, 2, and 3 in particular, a preferred embodiment of the invention may be seen, and it will be observed that broken line illustrations of portions of a pair of bucket seats 10 and 11 are shown with a broken line illustration of a cabinet, or console, 12 positioned therebetween. Broken line illustrations also indicate a roof line 13 and the device of the invention comprises a pair of telescopically arranged tubular members 14 and 15 respectively having extending tubular sections 16 and 17 respectively. Clamping chuck-like mechanisms 18 and 19 are secured to the upper ends of the tubular members 14 and 15 and arranged to clampingly engage the tubular members 16 and 17 so as to hold them in desired fixed relation thereto, as will be understood by those skilled in the art. Alternately, spring-urged constructions, such as those employed with the so-called lamp pole constructions, may obviously be substituted.

The upper ends of the tubular members 16 and 17 are provided with resilient caps 20 and 21 and the lower ends of the tubular members 14 and 15 are similarly provided with resilient feet, preferably in the form of vacuum cups 22 and 23. This construction enables the lower ends of the tubular members 14 and 15 to be securely positioned on the upper surface of the console 12 between the bucket seats 10 and 11 in the automobile.

An infant supporting seat is arranged to be positioned on the tubular members 14 and 15 in desired elevation relative to the console 12 and, as may best be seen in FIGURE 2 of the drawings, comprises a pair of elongated tubular sleeves 24 and 25, the inner diameter of which is sufficient to receive the tubular members 14 and 15 heretofore referred to. Set screws 26, 26 engaged in threaded openings in the sleeves 24 and 25 are provided to insure frictional engagement with the tubular members 14 and 15 and more particularly with the plurality of openings 27, 27 therein.

A pair of vertically spaced tubular frames 28 and 29 are attached to the tubular sleeves 24 and 25 in spaced vertical relation to one another, and a cushioned back member 30 and seat member 31 are secured thereto. Each of the tubular frames 28 and 29 are substantially rectangular in plan view as may best be seen by referring to FIGURE 3 of the drawings, and a vertical strap 32 is positioned between their foremost center sections as is customary in infant seat constructions. In order that the infant's seat construction 30, 31 thus disclosed may be moved vertically or removed and secured against accidental displacement with respect to the tubular sleeves 24 and 25, a pair of clamping arms 33 and 34, as best seen in FIGURE 3 of the drawings, are mounted on the back of the seat member 30 by having their inner spaced opposed ends loosely secured to a rotatable disc 35 carried by the back 30 by means of spaced pivot pins 59 and 60. It will thus be seen that when the disc 35 is revolved as by a hand wheel 36 integral therewith, the spaced pivots will rotate and the clamping arms 33 and 34 will move oppositely to one another so that their outer curved ends will effect a clamping, holding relation around a substantial portion of the tubular sleeves 24 and 25, as well as the tubular members 14 and 15 therein.

It will thus be seen that the entire assembly is positioned vertically by the set screws 26 and that the actual seat construction, including the back 30 and seat 31, is secured in the assembly by the clamping arms so that a quick stop of the automobile in which the device is positioned would not cause dislocation of either the infant's seat assembly or an infant positioned therein.

It will occur to those skilled in the art that modifications of the construction herein disclosed are possible and desirable under some circumstances, and by referring to FIGURES 4, 5 and 6 of the drawings, one such modification may be seen.

In FIGURES 4, 5 and 6, telescopic tubular members 38 and 39 are provided with tubular extensions 40 and 41 at both their upper and lower ends and clamp-like chuck constructions 42 and 43 are used to secure the telescopic members 38, 39, 40 and 41 in desired extended relation to one another. Resilient feet, preferably in the form of vacuum cups, 44 and 45 enable the device to be positioned on a narrow console in an automobile and cushioned end portions 46 and 47 are formed on the upper ends of the members 40 and 41 so as to engage the roof of the automobile. It will be observed that the members 38 and 39 are angularly disposed with respect to one another and at opposite inclination with respect to a vertical line midway therebetween. A pair of vertically spaced transversely positioned telescopic brace members 58 and 59 are each adjustably secured at their outer ends to the tubular members 38 and 39, and their telescopic middle sections are provided with registering apertures 48 and 49 respectively. Thus, the relative angularity of the telescopic brace members 38 and 39 may be changed by adjusting the effective length of the horizontally arranged telescopic brace assemblies 58 and 59, and the relative positions of the same held by set-screws positioned through the registering apertures 48 and 48 respectively. This construction permits the lower portions of the main vertical telescopic members 38 and 39 to be moved very close to one another, while at the same time the upper ends thereof are spread relatively far apart to take advantage of the transverse curve in the roof of the automobile in which the device is positioned.

In order that an infant supporting seat may be attached to the construction thus described, a pair of vertically spaced tubular frames 50 and 51 are provided and they are joined at their forward center section by a strap 52 and at their back portions by a back member 53. A seat 54 is positioned on the lower tubular frame 51 so that a complete infant supporting seat construction is defined by the frames 50 and 51, the back 53 and seat 54. In order that this assembly can be supported on the horizontally disposed telescopic brace members 58 and 59, vertically positioned clamping arms 55 and 56 are mounted on the back member 53 with hook-like formations on the upper and lower ends of the clamping arms 55 and 56 arranged to hook over the telescopic brace members 46 and 47. The intermediate or adjacent ends of the arms 55 and 56 are pivoted to a rotatable cam disc 57 which is operated like the cam disc 35 heretofore referred to in connection with FIGURES 1, 2 and 3 of the drawings.

It will thus be seen that when the V-shaped supporting frame formed of the telescopic members 38 and 39 can be firmly fixed in an automobile as described and illustrated in FIGURES 4 and 5 of the drawings, the seat assembly including the horizontal frames 50 and 51, the back member 53 and seat 54 are then attached to the horizontally disposed telescopic brace members 58 and 59 and secured thereto by the clamping arms 55 and 56.

It will thus be seen that an infant's seat for an automobile has been disclosed which meets the several objects of the invention, and having thus described my invention, what I claim is:

An infant's seat for an automobile comprising a pair of elongated extensible supporting members, means on the upper and lower ends of said supporting members for engaging upper and lower portions of said automobile body so as to position said support members therebetween, a pair of spaced tubular sleeves adjustably secured one on each of said support members, a pair of vertically spaced looped frame members secured to said tubular sleeves and extending outwardly therefrom, a seat and a back supported by said tubular sleeves and loops, means securing said back portion to said tubular sleeves including movable clamping arms having elongated channel portions for engaging the inner and rear portions of said tubular sleeve and a disc carried by said back portion including pivot pins thereon, said clamping arms being pivotally connected to said pins.

References Cited by the Examiner
UNITED STATES PATENTS

| | | | |
|---|---|---|---|
| 989,966 | 4/1911 | Hayden | 297—390 |
| 1,039,759 | 10/1912 | Knight | 297—254 |
| 1,362,987 | 12/1920 | Dunn | 5—94 |
| 1,408,729 | 3/1922 | Green | 297—243 |
| 2,481,382 | 9/1949 | Bennett | 297—345 |
| 2,624,395 | 1/1953 | Johnson | 297—345 |
| 2,740,642 | 4/1956 | Atwood | 297—385 |
| 2,833,554 | 5/1958 | Ricordi | 297—390 |
| 2,883,073 | 4/1959 | Morris | 248—354 |
| 2,890,740 | 6/1959 | Larson | 297—254 |
| 3,022,974 | 2/1962 | Knodel | 248—354 |
| 3,044,800 | 7/1962 | Wicker | 280—150 |
| 3,050,333 | 8/1962 | Smith | 297—232 |

FRANK B. SHERRY, *Primary Examiner.*